March 28, 1950 P. N. BOSSART 2,502,122
COUPLING UNIT FOR RAILWAY TELEPHONES
Original Filed Aug. 25, 1945
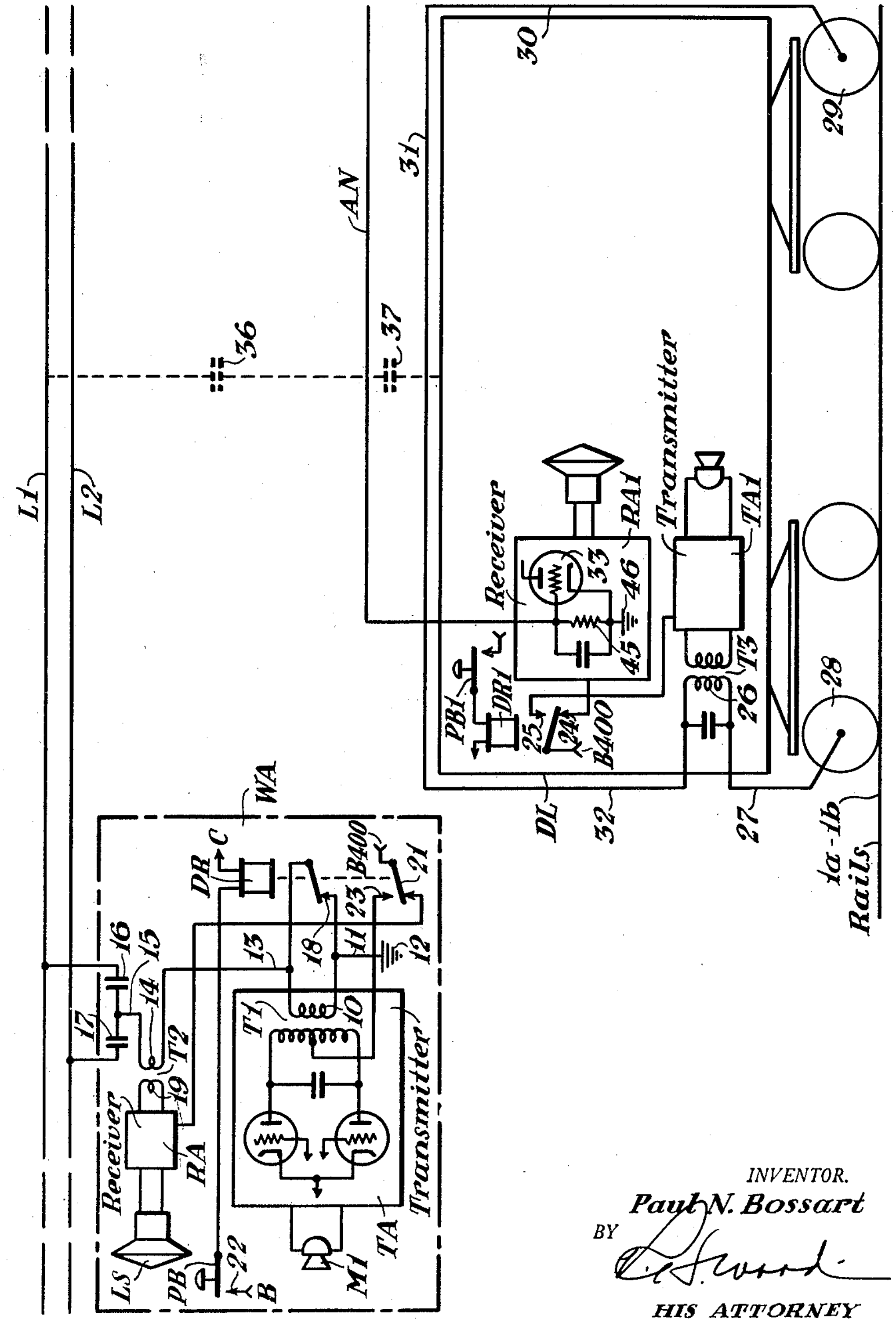
INVENTOR.
Paul N. Bossart
BY
[signature]
HIS ATTORNEY Patented Mar. 28, 1950

2,502,122

UNITED STATES PATENT OFFICE 2,502,122

COUPLING UNIT FOR RAILWAY TELEPHONES

Paul N. Bossart, Cheswick, Pa., assignor to The Union Switch & Signal Company, Swissvale, Pa., a corporation of Pennsylvania Original application August 25, 1945, Serial No. 612,686. Divided and this application December 31, 1947, Serial No. 795,110

2 Claims. (Cl. 179—2.5)

My invention relates to railway train communication apparatus, and more particularly to railway train communication equipment using a carrier telephone current.

The present application is a division of my copending application for Letters Patent of the United States, Serial No. 612,686, filed August 25, 1945, for Railway train communication apparatus.

Railway train communication usually involves telephone communication between a wayside station and a train, as well as between different trains and between two spaced points of a train.

In such carrier telephone apparatus energy is picked up at a train carried station through train carried elements electrically coupled with wayside circuit elements.

The wayside circuit generally includes the longitudinal circuit of a line wire extending along the railway track, or better still the longitudinal circuit of a pair of line wires in multiple and which wires may be an existing pair of line wires that make up the two sides of a transverse telegraph or similar circuit. The use of the line wires in a longitudinal circuit for train communication is in addition to their present use and without interference thereto.

In view of the foregoing conditions, a feature of my invention is the provision of novel and improved railway train communication apparatus for use at a wayside station.

Other features, objects and advantages of my invention will appear as the specification progresses.

The foregoing features, objects and advantages of my invention are attained through the provision of improved means to couple the wayside station equipment to a pair of line wires that extend parallel to the track and which wires serve with the track rails as elements of a transmitting channel due to the mutual distributed induction between the line wires and the rails and the distributed impedance of the line wires and rails to ground.

For a fuller understanding of my invention reference may be had to the accompanying drawing which is a diagrammatic view showing one form of apparatus embodying my invention when used for communication between a wayside station and a Diesel locomotive.

It is to be understood that the invention is not limited to communication between a wayside station and a Diesel locomotive and this one application of the invention serves to illustrate the usefulness of the apparatus.

Referring to the drawing, a wayside station of a railway is indicated by a dash and dot rectangle WA, and a Diesel locomotive which operates over the railway is indicated by the reference character DL. The reference characters L1 and L2 designate a pair of line wires that extend along the railway, such wires being ordinarily carried on a pole line along the right of way so that the line wires are parallel to and relatively near the track. These line wires L1 and L2 may be existing line wires used in a telegraph or similar circuit and which wires are used for transmission of a train telephone current in a manner to appear shortly as an additional service without interference with their original service. It will be understood, however, that the line wires L1 and L2 may be wires provided for transmission of a telephone current only. These line wires and other paralleling conductors serve with the track rails to form a transmitting channel for conveying a carrier telephone current along the railway, current being conveyed by virtue of the distributed mutual inductance and capacitance between the line wires and the rails and by virtue of the distributed impedance of the line wires and rails to ground. That is, the longitudinal circuit of the line wires L1 and L2 is an effective element of the transmitting channel for the train communication current.

The wayside station WA is equipped with telephone apparatus coupled to the line wires L1 and L2, and which apparatus includes a receiver RA and a transmitter TA. The receiver RA and transmitter TA are indicated conventionally in block form because each such apparatus per se forms no part of my invention and each may be any one of several arrangements, one arrangement of such transmitter and receiver being of the frequency modulating carrier type disclosed in my copending application for Letters Patent of the United States, Serial No. 575,311, filed January 30, 1945, now Patent No. 2,484,680, granted November 11, 1949, for Railway train communication systems. It is sufficient for the present application to point out that the transmitter TA is operable when energized to frequency modulate a preselected carrier current by voice frequencies created in a microphone M1 and the resultant carrier telephone current is passed to a secondary winding 10 of an output transformer T1. The receiver RA is operable when energized to demodulate such carrier telephone current and reproduce the speech in a loud-speaker LS, the telephone current being applied to the receiver through a primary winding 14 of an input transformer T2, a secondary winding 19 of which transformer is connected to the input terminals of the receiver.

The transmitter TA and the receiver RA are selectively controlled by a directional relay DR to effect two-way communication between the wayside station and remote points. The relay DR is normally deenergized and is energized through an obvious circuit including a normally open contact 22 of a push-to-talk switch PB and terminals B and C of a source of current, such as a battery not shown. With relay DR deenergized to close back contact 21, a circuit connection is completed by which terminal B400 of a suitable power source not shown, is connected to the receiver RA, and the receiver is energized and placed in an active condition. With relay DR energized due to the operation of switch PB, the power source is disconnected from the receiver and is connected to the transmitter through a circuit connection including front contact 23 of the relay, and under this circumstance the transmitter TA is energized and placed in an active condition. Thus, normally, the transmitter is deenergized and the receiver RA is energized and conditioned for reception and the receiver may be deenergized and the transmitter energized and conditioned for sending by the operation of the press-to-talk switch PB.

The receiver RA and transmitter TA are coupled to line wires L1 and L2 through a circuit connection governed by the directional relay DR. Such circuit connection is formed by two capacitors 16 and 17 being connected in series across the line wires and the junction terminal of the capacitors being connected to a ground electrode 12, through primary winding 14 of input transformer T2, wire 13, either back contact 18 of relay DR or secondary winding 10 of output transformer T1 and wire 11 to ground electrode 12. Thus when relay DR is released for reception, the winding 10 of the output transformer T1 is shunted by the path through back contact 18 of relay DR and winding 14 of the input transformer T2 alone is included in the circuit connection, but that when relay DR is picked up for sending the winding 10 of the output transformer is interposed in the circuit connection. The winding 14 preferably consists of a turn or two and is of relative low impedance and the winding 10 preferably consists of several turns and is of higher impedance. It follows that by the arrangement here provided the line circuit connection at the station WA is conditioned for most effective energy transfer under both sending and receiving of the telephone current.

From the foregoing description of the apparatus of the wayside station it is to be seen that the apparatus is conditioned to receive a frequency modulated carrier telephone current supplied to the line wires L1 and L2 at some remote point, such as the locomotive DL, the current thus supplied to the line wires flowing through the circuit connection at the wayside station to excite the receiver through the input transformer T2, the station circuit connection being of low impedance to improve the transmission. To send from the station WA, the switch PB is closed to bring about the energizing of relay DR so that the telephone apparatus is switched to the sending condition and the carrier telephone current created in the transmitter TA is applied to the line wires through the circuit connection and the current thus supplied to the line wires flows therein due to the distributive capacitance of the line wire to ground, and this line circuit current is available for influencing the receiving apparatus located at points along the railway, such points being for example, a locomotive DL.

The Diesel locomotive DL is provided with telephone apparatus which includes a transmitter TA1, and a receiver RA1, shown in block form and which apparatuses would preferably be similar to the wayside station transmitter TA and receiver RA, respectively. The transmitter TA1 and receiver RA1 are selectively controlled for two-way operation through a directional relay DR1 which in turn is controlled through a push-to-talk switch PB1, the arrangement being such that relay DR1 is normally deenergized closing back contact 24 to complete a connection by which terminal B400 of the power source of the locomotive is connected to the receiver RA1 and the receiver is energized and placed in condition for reception, but that when relay DR1 is energized closing front contact 25, the power source is switched to the transmitter TA1 and the transmitter is energized and placed in an active condition for sending.

As here shown, the transmitter TA1 is coupled to the track rails 1*a* and 1*b* through a sending loop circuit connected to two spaced pairs of wheels of the locomotive, the connection to the wheels being in any of the well known arrangements. Such sending loop circuit can be traced from secondary winding 26 of output transformer T3 of the transmitter TA1, through wire 27, a pair of wheels 28 (only one of which pair of wheels is shown in the drawing), rails 1*a* and 1*b* in multiple to a pair of wheels 29, a vertical wire 30, wire 31 extending lengthwise of the locomotive and a vertical wire 32 back to the winding 26. Thus for sending from the locomotive the telephone current is supplied to this loop circuit and a corresponding electromotive force is induced in the line wires L1 and L2 due to the induction between the line wires and the track rails and the induction between the loop circuit and the line wires and as the result of this electromotive force induced in the line wires, the communication current flows in the longitudinal circuit made up of the line wires L1 and L2 in multiple. It is clear that such line circuit current will flow in the circuit connection of the wayside station WA to excite the receiver RA at the wayside station and thereby reproduce the speech of the telephone current supplied by the transmitter TA1 of the locomotive DL.

The receiver RA1 of the Diesel locomotive is electrically coupled to the line wires L1 and L2 through an antenna comprising a wire AN mounted preferably above and lengthwise along the roof of the locomotive, the antenna wire being secured in place by suitable insulators, not shown. One end of this antenna wire AN is free and the other end is connected to the input of the receiver RA1 by being connected to the grid of a first stage amplifier tube 33, the cathode of the tube being connected to the ground electrode 46 and a tuning capacitor 44 and a grid leak resistor 45 in multiple being connected between the grid and cathode. Thus when carrier telephone current flows in the line wires L1 and L2 energy is electrostatically transferred to the antenna AN due to the capacitance coupling between the antenna wire and the line wires. The line wires L1 and L2 parallel the track, and the antenna AN may be considered as tapping off a portion of a voltage between the line wires and ground, the amount of energy thus transferred depending upon the relative value of the capacitance between the wires L1 and L2 and the antenna AN, and between the antenna AN and ground as represented by the frame of the locomotive DL. These capacitances are visualized in the drawing by capacitors 36 and 37 indicated by dotted lines, it being understood that these capacitors 36 and 37 form no material piece of apparatus. The energy thus picked up by the antenna AN is applied to the receiver RA1 to excite the receiver and the speech of the carrier telephone current is reproduced at the loud-speaker of the locomotive. Consequently, carrier telephone current supplied to the line wires at the station WA in the manner explained hereinbefore serves to excite the receiver on the locomotive and the speech is reproduced at the loud-speaker on the locomotive.

It is clear that communication between the vehicle DL and the wayside station WA having communication equipment coupled to the line wires L1 and L2 in the manner disclosed in the drawing will be effected with a high degree of effectiveness due to the efficient coupling of the station equipment to the line wires.

Apparatus such as here disclosed has the advantages that effective sending and receiving is accomplished at wayside stations.

Although I have herein shown and described only one form of railway train communication apparatus embodying my invention, it is understood that various changes and modifications may be made therein within the scope of the appended claims without departing from the spirit and scope of my invention.

Having thus described my invention, what I claim is:

1. In railway train communication apparatus the combination comprising, a wayside station provided with a carrier telephone transmitter and a carrier telephone receiver, an output transformer and an input transformer at said station and each having a primary and a secondary winding, said primary winding of said output transformer connected to the output of said transmitter and said secondary winding of said input transformer connected to the input of said receiver, said primary winding of said input transformer of a few turns and characterized by a relatively low impedance, said secondary winding of said output transformer of several turns and characterized by a relatively high impedance, a line circuit including a pair of line wires in multiple and the ground path, a pair of capacitors connected in series across said line wires, a circuit connection including said primary winding of the input transformer and said secondary winding of the output transformer in series and connected between the junction terminal of said capacitors and ground, a directional circuit controller having a first and a second position, means including a contact of said controller closed at its first position connected across said secondary winding of the output transformer to short circuit that winding, and means including a contact of said controller closed at its first position to supply power to said receiver and including a contact of the controller closed at its second position to supply power to said transmitter.

2. In railway train communication apparatus, the combination comprising, a wayside station provided with a carrier telephone transmitter and a carrier telephone receiver, an output transformer having a primary and a secondary winding, said primary winding connected to the output of said transmitter and said secondary winding having a relatively large number of turns which gives the winding a relatively high impedance and provides a relatively high output voltage, an input transformer having a primary and a secondary winding, said secondary winding of the input transformer connected to the input of said receiver and said primary winding of the input transformer having a single turn which gives the winding a relatively low impedance, a line circuit including at least one line wire and the ground path, a circuit connected between said line wire and ground and including said primary winding of said input transformer and said secondary winding of said output transformer in series, a directional relay operable to a first and a second position, means including a first position contact of said relay to short circuit said secondary winding of said output transformer, power supply means including a first position contact of said relay to supply power to said receiver and including a second position contact of the relay to supply power to said transmitter, and means including a push-to-talk switch for selectively operating said relay to its first and second positions.

PAUL N. BOSSART.

REFERENCES CITED

The following references are of record in the file of this patent:

UNITED STATES PATENTS

| Number | Name | Date |
|---|---|---|
| 1,472,485 | Morrill | Oct. 30, 1923 |
| 1,743,025 | Cohen | Jan. 7, 1930 |
| 1,934,736 | Phebus | Nov. 14, 1933 |
| 2,124,450 | Shaver | July 19, 1938 |
| 2,264,397 | Moore | Dec. 2, 1941 |